R. HEAD.
PROCESS OF MAKING PHONOGRAPH RECORDS.
APPLICATION FILED DEC. 16, 1915.
1,326,728.
Patented Dec. 30, 1919.
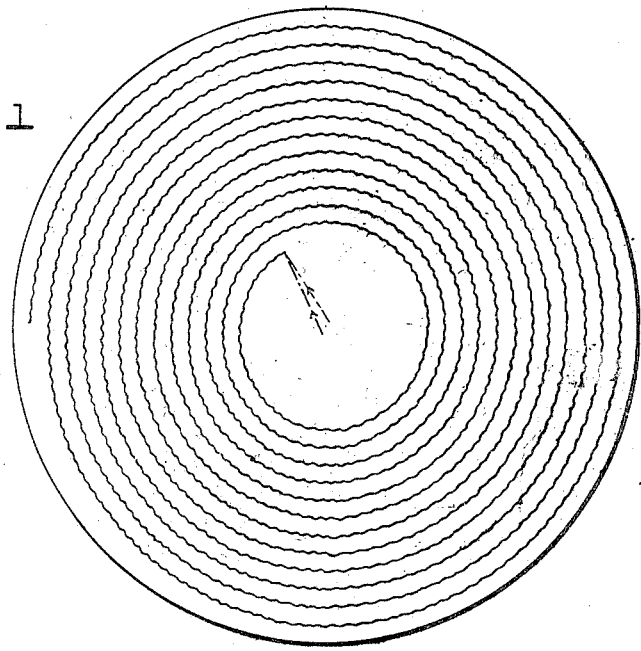
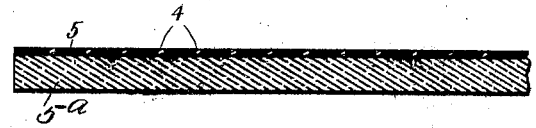
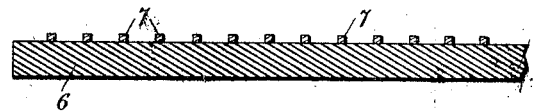
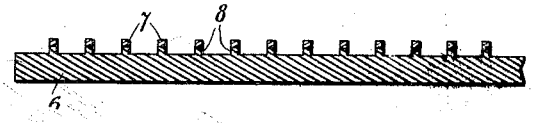
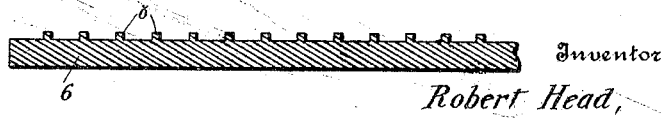
Inventor
Robert Head,

UNITED STATES PATENT OFFICE.

ROBERT HEAD, OF NEW YORK, N. Y., ASSIGNOR TO THE AEOLIAN COMPANY, A CORPORATION OF CONNECTICUT.

PROCESS OF MAKING PHONOGRAPH-RECORDS.

1,326,728.  Specification of Letters Patent.  Patented Dec. 30, 1919.

Application filed December 16, 1915. Serial No. 67,196.

*To all whom it may concern:*

Be it known that I, ROBERT HEAD, a citizen of the United States, residing at New York, in the county and State of New York, have invented certain new and useful Improvements in Processes of Making Phonograph-Records, of which the following is a specification.

My present invention relates to a process of making phonograph records, especially of the laterally waved or zig-zag type, the nature and advantages of which will be readily appreciated by those skilled in the art from an understanding of the following description.

In the accompanying drawing—

Figure 1 is a diagrammatic view showing one method of photographically recording the sound waves.

Fig. 2 represents, on an enlarged scale, a section of a photographic negative having the sound waves recorded thereon.

Fig. 3 represents an enlarged section through a portion of a photographic positive which is obtained from a negative such as that shown in Fig. 2.

Fig. 4 represents, on an enlarged scale, a section of a portion of a sensitized etchable plate after it has been exposed through the positive shown in Fig. 3, and developed.

Fig. 5 is a view similar to Fig. 4 showing the plate after it has been etched.

Fig. 6 is a view similar to Fig. 5 showing the finished plate or matrix.

By any well known or preferred apparatus I photographically record the sound waves as shown in Fig. 1 and get a photographic negative 1 showing a dense or black laterally waved sound-record line 2 on a light ground 3 (Fig. 2). The record may be of the usual spiral form. I prefer to make this photograph larger than the finished or commercial record so that the details of the sound-wave are magnified. I then rephotograph this negative in any well known photographic apparatus to produce what may be called a positive of the original negative, reduced to the commercial record size. This latter photograph as represented in Fig. 3 shows the sound-wave as a clear or transparent zig-zag line 4, whereas the portions 5 adjacent said line or intermediate the spirals are dense and non-transparent, the positive being supported on a transparent base 5ª.

Of course I may make the original negative of the final, commercial record size and then make the described "positive" therefrom by a direct contact photographic printing operation.

Proceeding now with the next step of my process, I take a sensitized copper or steel or other suitable etchable plate, for instance such as that commonly used in the art of making half tone etchings. This sensitized plate I expose to the light with the aforesaid "positive" in contact therewith and after a suitable exposure, develop it in the well known manner practised in making half tone etchings and the like. The result of this exposure is that the sensitized film, usually containing as it does bichromated gelatin, becomes insoluble wherever acted upon by the light immediately under the transparent sound-record trace in the "photograph;" but elsewhere is soluble. Therefore the developed metal plate 6 as represented in Fig. 4 has its sensitized coating entirely removed everywhere except for a zigzag spiral line 7 corresponding to the sound-line in the photograph.

I then etch the plate by the usual etching methods and continue this operation until the metal between the spirals is etched away to a suitable depth as represented in Fig. 5. The coating on the plate corresponding to the zig-zag sound line protects the metal there from the etching fluid with the net result that a metal plate is directly produced having a lateral sound-wave 8 raised thereon in relief, adapted to be used to press the commercial records therefrom in well known manner. It now remains only to finish this matrix by dissolving off the remaining gelatin coating with alkali; and also its surface may be buffed to brighten and smooth the matrix, the finished matrix being represented by Fig. 6. Also its surface may be flashed over electrolytically with a film of nickel.

I prefer to perform the buffing operation partly before I dissolve off the gelatin or enamel coating. This coating protects the tops of the waves while their sides are being buffed. Then after removing the enamel coating, I buff again to remove any sharp corners or edges. After this I may plate on a film of nickel to finish the matrix. The matrix which I produce is easy to buff to smooth out any roughness due to the etching because the sound waves are in the form of raised ridges as distinguished from depressed grooves, the sides and bottom of which latter naturally are difficult to get at.

What I claim is:—

1. The process which comprises, making a photograph of the sound waves consisting of a transparent line in a dense ground, exposing a light-sensitive etchable plate through said photograph, and developing and etching said plate to convert it into a sound-record matrix.

2. The process which comprises, making a photograph of the sound waves consisting of a transparent line in a dense ground, and then making from said photograph by a photo-etching method a sound-record matrix wherein the sound waves are etched in relief thereon.

3. The process which comprises, making a photograph of the sound waves consisting of a transparent line in a dense ground, and then making from said photograph by a photo-etching method a sound-record matrix wherein the sound waves are etched in relief thereon; and buffing the active surfaces of said matrix to smooth roughness due to the etching.

4. The process which comprises, making a photograph of the sound waves consisting of a transparent line in a dense ground, exposing through said photograph an etchable plate having a light-sensitive coating, developing said plate to dissolve off said coating except where it was exposed to the light, etching said plate, buffing said plate, then removing the coating.

5. The process which comprises, making a photograph of the sound waves consisting of a transparent line in a dense ground, exposing through said photograph an etchable plate having a light-sensitive coating, developing said plate to dissolve off said coating except where it was exposed to the light, etching said plate, buffing said plate, then removing the coating and rebuffing.

In testimony whereof, I have signed my name to this specification this fifteenth day of December, 1915.

ROBERT HEAD.